United States Patent
Daubenbüchel et al.

(10) Patent No.: US 6,488,884 B1
(45) Date of Patent: Dec. 3, 2002

(54) PROCESS AND APPARATUS FOR PRODUCING HOLLOW BODIES FROM THERMOPLASTIC MATERIAL

(75) Inventors: Werner Daubenbüchel, Overath (DE); Erich Kiefer, Bonn (DE); Karsten Friedrichs, Bad Honnef (DE); Dieter Hess, Swisttal (DE); Peter Klüsener, Bonn (DE); Ulrich Naumann, Lüdenscheid (DE)

(73) Assignee: SIG Kaurx GmbH + Co. KG, Bonn (DE)

( * ) Notice: Subject to any disclaimer, the term of this patent is extended or adjusted under 35 U.S.C. 154(b) by 0 days.

(21) Appl. No.: 09/519,190

(22) Filed: Mar. 6, 2000

(30) Foreign Application Priority Data

Mar. 18, 1999 (DE) .......................... 199 12 116

(51) Int. Cl.[7] ............................... B29C 49/56
(52) U.S. Cl. ...................... 264/523; 425/450.1; 425/541
(58) Field of Search ................. 425/532, 541, 425/450.1, 451.9; 264/523, 540, 542

(56) References Cited

U.S. PATENT DOCUMENTS

| | | | |
|---|---|---|---|
| 3,068,511 A | | 12/1962 | Ahlbeck et al. |
| 3,069,722 A | * | 12/1962 | Kato ............................ 425/541 |
| 3,078,508 A | * | 2/1963 | Martin, Jr. .................... 425/541 |
| 3,110,928 A | * | 11/1963 | Engman ....................... 425/541 |
| 3,749,541 A | | 7/1973 | Mehnert |
| 3,837,780 A | * | 9/1974 | Strong ......................... 425/532 |
| 3,880,565 A | | 4/1975 | Barr et al. ................... 425/150 |
| 4,005,964 A | * | 2/1977 | Bishop ....................... 425/451.9 |
| 4,606,717 A | | 8/1986 | Polak et al. .................. 425/541 |
| 4,959,191 A | | 9/1990 | Yoshioka et al. ............. 264/529 |
| 5,368,462 A | * | 11/1994 | Kiefer et al. ................ 425/541 |
| 5,551,862 A | | 9/1996 | Allred, Jr. .................... 425/532 |
| 5,562,934 A | | 10/1996 | Langos et al. ................ 425/532 |
| 5,975,881 A | * | 11/1999 | Langos et al. ................ 425/541 |

FOREIGN PATENT DOCUMENTS

| | | |
|---|---|---|
| DE | 1479348 | 1/1972 |
| DE | 3428823 A1 | 2/1986 |
| DE | 93 08 467.6 U1 | 9/1993 |
| EP | 0 116 132 A1 | 8/1984 |
| EP | 0 438 721 A2 | 7/1991 |
| EP | 0 768 165 A2 | 4/1997 |
| EP | 0 879 690 A2 | 11/1998 |
| GB | 1096548 | 12/1967 |
| WO | WO 93/23232 | 11/1993 |

* cited by examiner

*Primary Examiner*—Robert Davis
(74) *Attorney, Agent, or Firm*—Drinker Biddle & Reath LLP

(57) ABSTRACT

In a process and apparatus for producing hollow bodies from thermoplastic material by blow molding of preforms using a closing support structure having at least first and second blow molding molds, a common drive means engages a drive plate and a first carrier plate which carries a mold portion. The drive plate is connected to a second carrier plate carrying another mold portion. At least one further carrier plate is arranged displaceably in the opening and closing direction between the first and second carrier plates. At each of its two sides the further carrier plate carries a respective mold portion, each thereof with a mold portion carried by an adjacent carrier plate forming a respective blow molding mold. Each of the two blow molding molds afforded thereby is provided with a means for locking the respective mold in the closed condition thereof. The support structure has at least one synchronisation means for symmetrical implementation of the closing and opening movements of the parts of the respective mold.

15 Claims, 7 Drawing Sheets

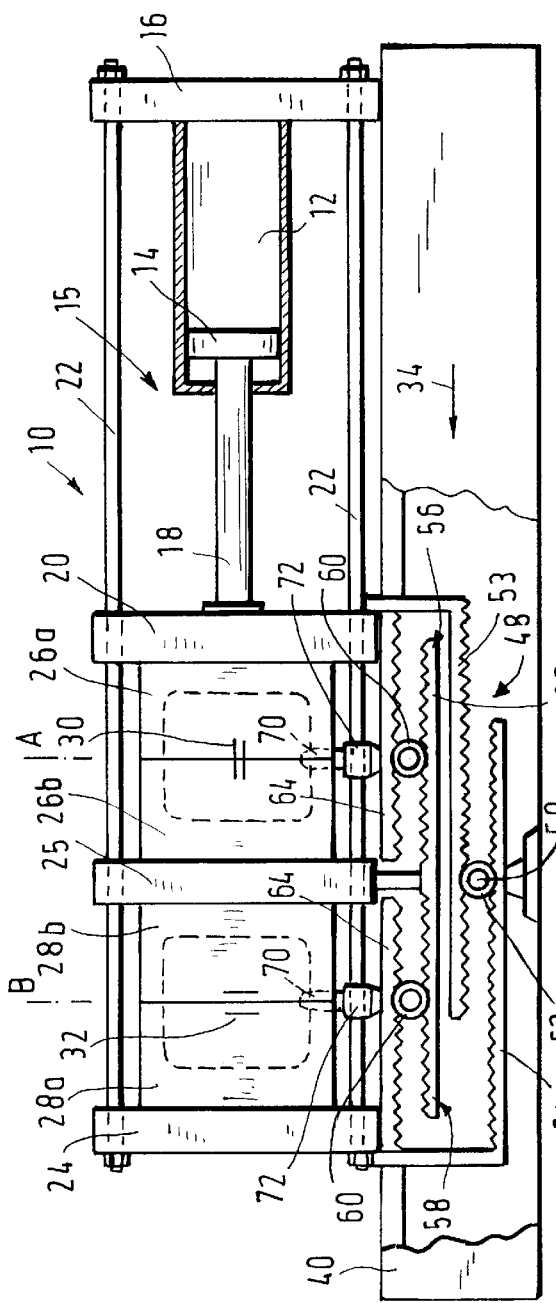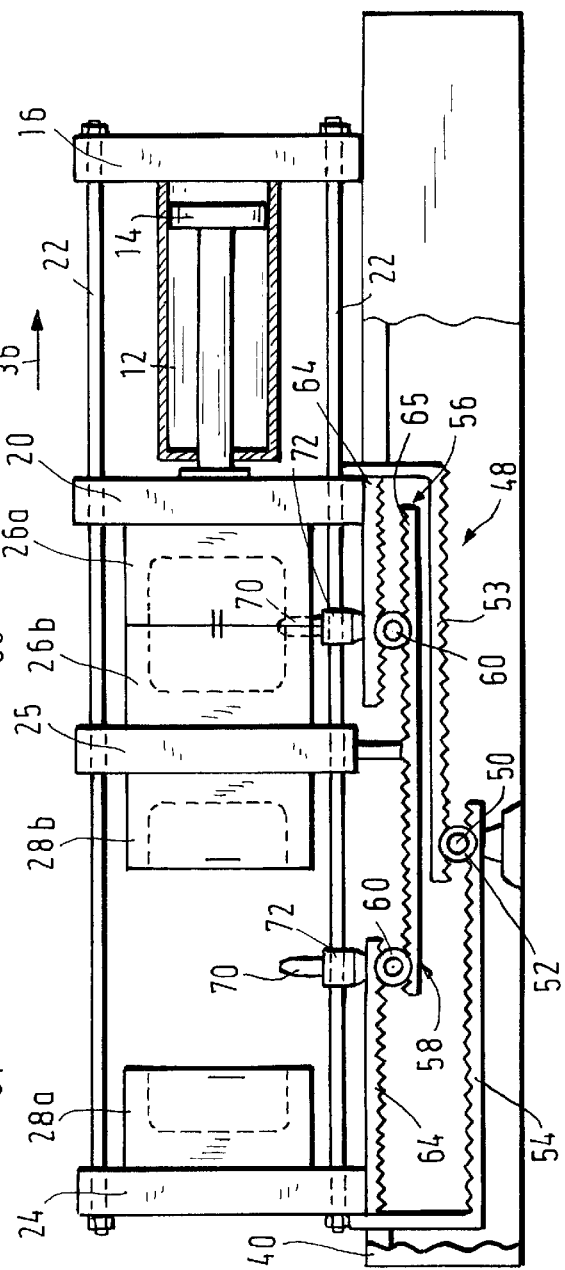

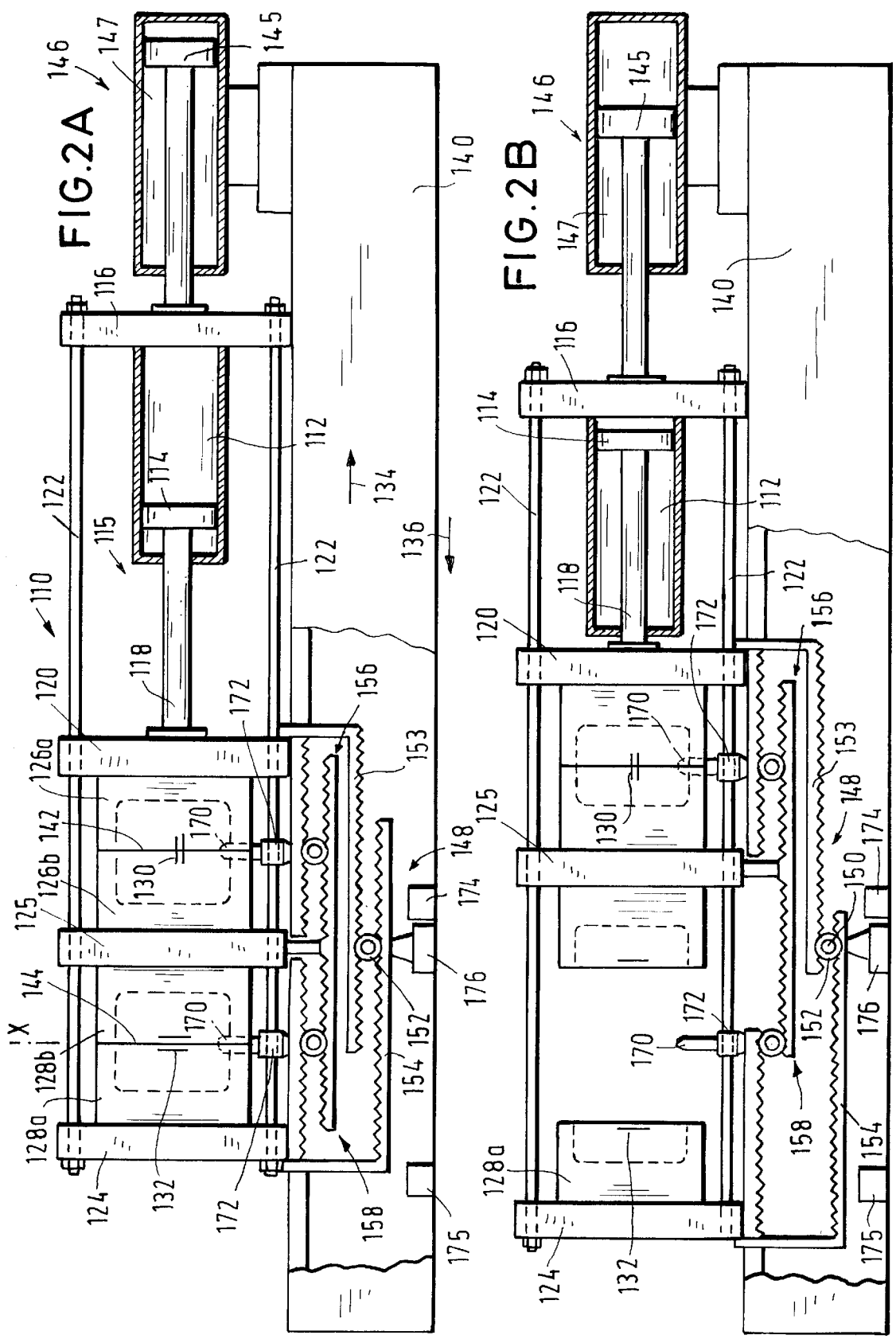

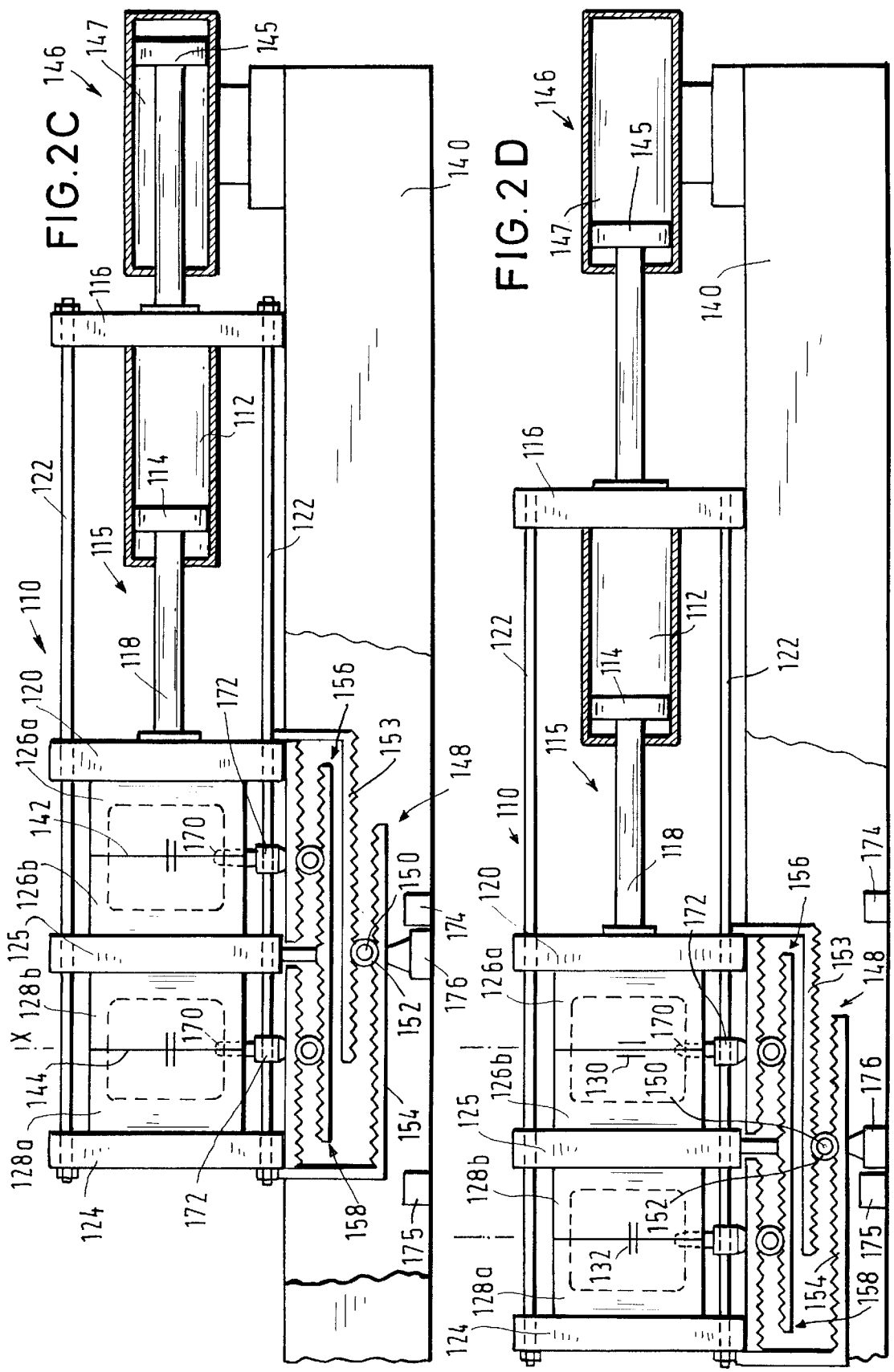

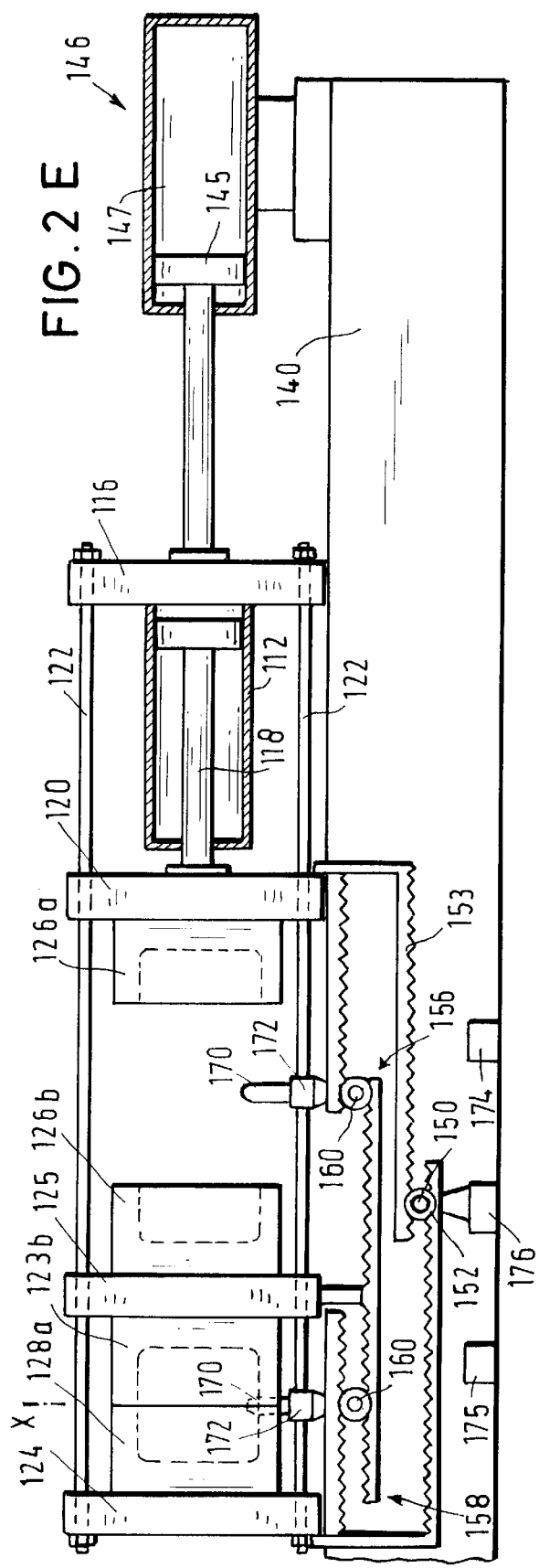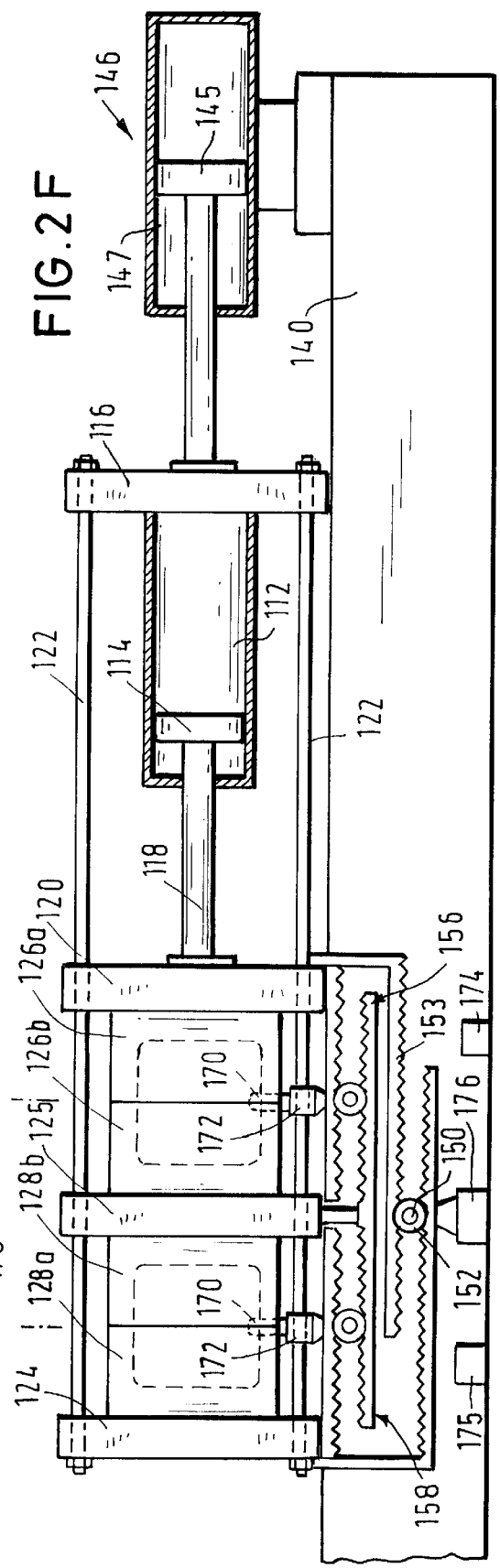

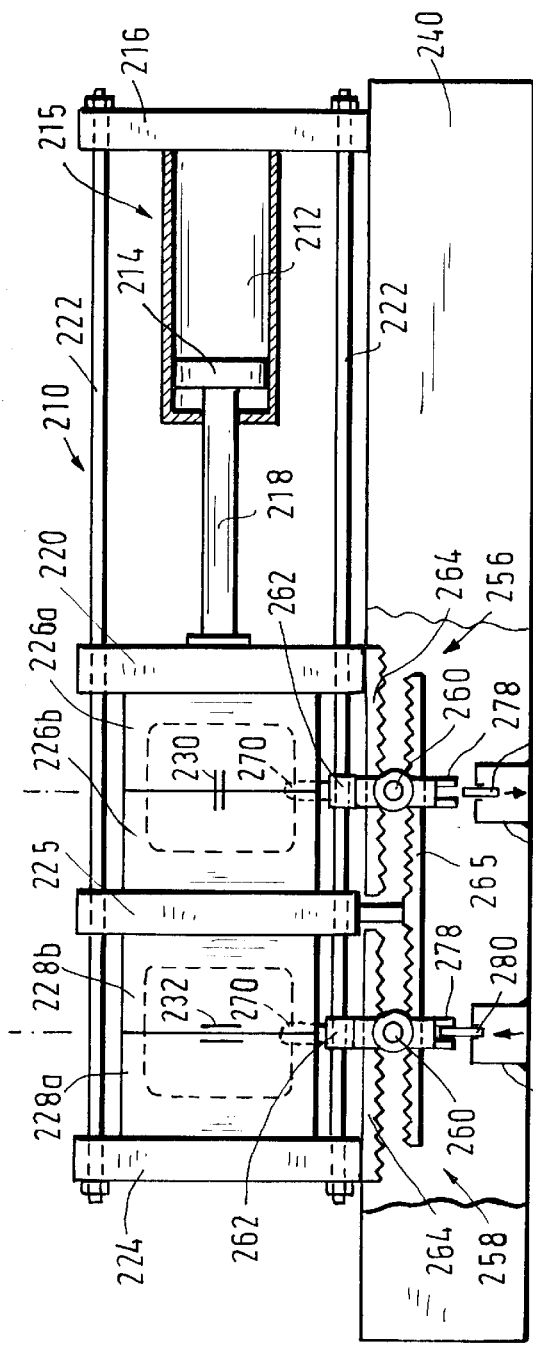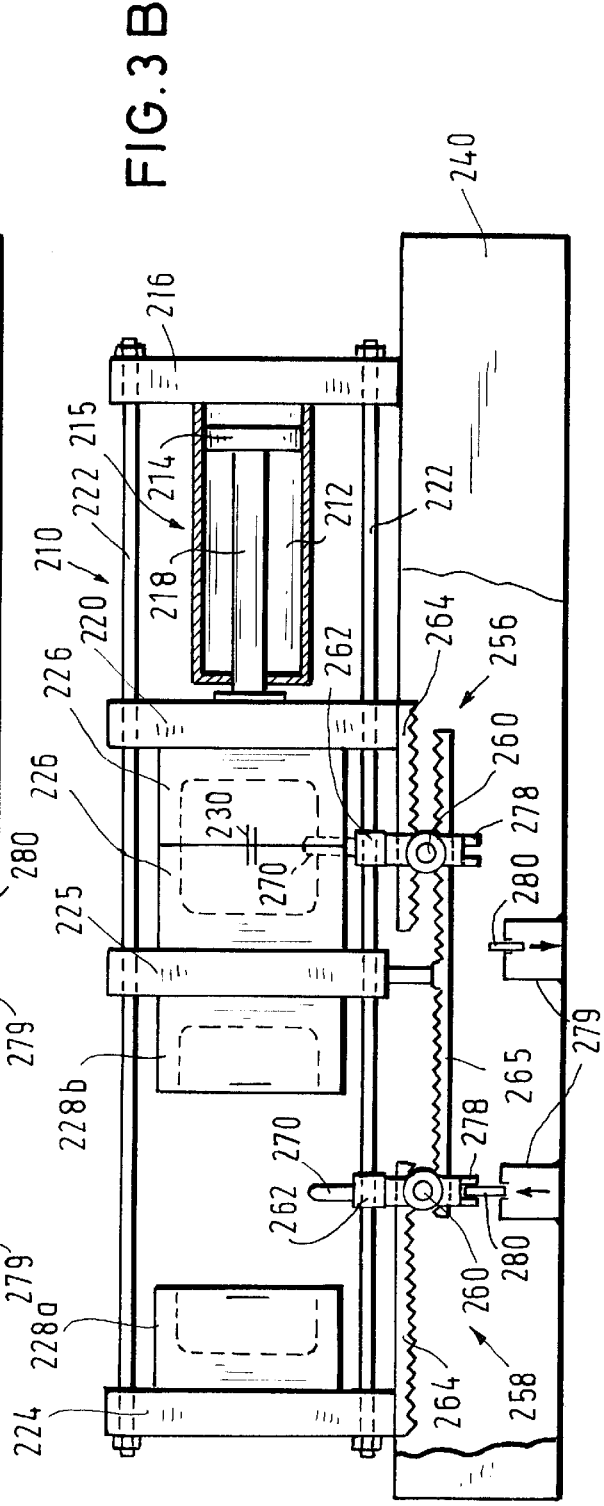

US 6,488,884 B1

PROCESS AND APPARATUS FOR PRODUCING HOLLOW BODIES FROM THERMOPLASTIC MATERIAL

FIELD OF THE INVENTION

The invention generally concerns a process and an apparatus for producing hollow bodies from thermoplastic material by means of blow molding.

BACKGROUND OF THE INVENTION

A typical form of process for the production of hollow bodies from thermoplastic material using the blow molding procedure provides that a preform of a preferably tubular configuration is received by a blow molding mold having at least two blow molding mold portions. The preform is expanded in the closed mold under the effect of an increased internal pressure within the preform. The two portions of the mold are reciprocatable between an open condition in which they are at a suitable spacing from each other and a closed condition in which they define a mold cavity whose contour corresponds to the configuration of the desired expanded preform. The reciprocating movement of the mold portions is produced by a drive system for moving the mold portions between the open and closed positions thereof.

Apparatuses for carrying out such a procedure may be designed in such a way as to have a closing support structure comprising three plates, the support structure having only one drive means for the opening and closing movements of the mold portions. The common drive means is disposed between a first carrier plate which carries a mold portion and a drive plate which is connected by beam members or other suitable connecting members to a second carrier plate which is disposed on the other, remote, side of the first carrier plate. The second carrier plate carries the other mold portion. The consequence of actuation of the drive in the mold-closing direction is that, when a synchronisation element which is fixedly arranged on the main frame structure of the apparatus kinematically connects the mold portions or their carrier plates together in order to implement synchronous movements of the mold portions, the mold portions move symmetrically towards the preform. It may be noted in this respect that the preform may be suspended from the extrusion head of the extruder producing the preform, but it may equally be held in some other fashion, for example by a gripping device.

Triple-plate closing support structures of the above-outlined kind enjoy the advantage of being of a simple, clearly laid-out structure. A considerable contribution to that aspect is made by the fact that the two mold portions only require a common drive for implementing the opening and closing movements of the mold.

SUMMARY OF THE INVENTION

An object of the present invention is to provide a process for the production of hollow bodies from thermoplastic material such that the productivity of the operating procedure involved can be markedly increased without an increase in apparatus expenditure in line with the increase in productivity.

Another object of the present invention is to provide a process for the production of hollow bodies from thermoplastic material using blow molding, which affords a fast, rational operating procedure affording enhanced versatility in terms of production engineering and output.

Still a further object of the present invention is to provide apparatus for producing hollow bodies from thermoplastic material, which is designed to provide a higher level of output than previous machines, without a significant increase in the degree of complication of the apparatus structure and accordingly cost.

In accordance with the principles of the present invention, in the process aspect, the foregoing and other objects are attained by a process for the production of hollow bodies from thermoplastic material by means of blow molding of preforms, using a support structure having at least one blow molding mold comprising at least first and second mold portions. The mold portions are reciprocatable between an open condition in which they are at a spacing from each other and a closed condition defining a mold cavity. The mold portions are so reciprocatable by a common drive means engaging a drive plate and a first carrier plate which carries a mold portion, with the drive plate being connected to a second carrier plate carrying another mold portion. At least one further carrier plate is arranged displaceably in the opening and closing direction between the first carrier plate and the second carrier plate. The further carrier plate carries at each of the sides thereof a respective mold portion, while each of the mold portions, with a mold portion carried by a respective adjacent carrier plate, forms a respective blow molding mold. Each of the two blow molding molds thus provided has a means associated therewith and operable to lock the respective mold in the closed condition thereof. The support structure further includes at least one synchronisation means for symmetrically implementing the closing and opening movements of the parts of the respective mold.

Further in accordance with the invention, in the apparatus aspect, the foregoing and other objects are attained by apparatus for producing hollow bodies from thermoplastic material by means of blow molding of preforms, the apparatus including a closing support structure comprising a blow molding mold having at least first and second blow molding mold portions reciprocatable between an open condition in which they are at a spacing from each other and a closed condition in which they define a mold cavity, the mold portions being so displaceable by a common drive means. The drive means engages a drive plate and a first carrier plate which carries one of the mold portions, while the drive plate is further connected to a second carrier plate carrying another mold portion. At least one further carrier plate is arranged displaceably in the opening and closing direction between the first carrier plate and the second carrier plate, with the at least one further carrier plate carrying at each of the sides thereof a respective mold portion, whereby each of those mold portions on the further carrier plate is co-operable with a respective mold portion carried by a respective adjacent one of the first and second carrier plates, thereby to form a respective blow molding mold. Each of the two blow molding molds afforded in that way has a means operable to lock same in the closed condition thereof and the support structure has at least one synchronisation means for ensuring symmetrical implementation of the closing and opening movements of the respective mold.

As will be seen from a detailed description hereinafter of embodiments of an apparatus in accordance with the present invention, for carrying out the process thereof, the operating procedure and apparatus design configuration in accordance with the invention can be summarised, by means of the example of an apparatus having two blow molding molds, insofar as the closing support structure which has first, second and third plates, more specifically the drive plate and the first and second carrier plates, is provided with an additional carrier plate disposed between the two carrier plates. The additional carrier plate carries two mold portions which each co-operate with one of the two mold portions carried by the first and second carrier plates, to afford a respective mold. The two molds formed in that way can be opened and closed alternately by the common drive, with the alternation between the molds being effected by suitable actuation of locking devices by means of which the parts of a mold can be fixedly connected together.

As will become more clearly apparent hereinafter, in that way, by simply doubling the number of molds, it is possible to double the capacity or productivity of the apparatus, without any need to also double other parts of a blow molding apparatus, that is to say for example the drives for the mold portions. As the respective mold which is in the locked condition is connected by way of the at least one additional, freely displaceable carrier plate, to the part of the other mold carried thereby, the locked mold as a closed unit takes part in the opening and closing movements of the respective other mold so that, in spite of the presence of a total of four plates the kinematics of a triple-plate closing support structure are nonetheless retained. Determining that one of the two molds which is opened and closed upon actuation of the common drive means is achieved by suitable control of the locking devices, parts of which can be disposed on the carrier plates.

A corresponding consideration also applies in regard to design configurations with two or more additional carrier plates and thus three or more molds. In all cases, a common drive means can be provided for all the molds of the apparatus, for implementing the opening and closing movements thereof. Closure of the preform at at least one end thereof to constitute a closed body in which the increased internal pressure for expansion thereof can be produced and the step of squeezing off excess material on the exterior of the preform, are also implemented by the common drive means. This means that the locking arrangement associated with each mold can be relatively simple in structure as it is only operative after the mold has been closed.

In addition to the common drive means, it is also possible to provide a drive device which is operative in the last phase of the closing movement of the mold portions and which applies at least a part of the forces required for squeezing off the excess material on the preform and for closing the preform by heat-sealing or welding thereof. This additional drive arrangement is used alternately for all molds so that the arrangement also only has to have one thereof.

It will be appreciated that it is necessary for the capacity of the apparatus which supplies the preforms to be expanded in the molds also to be increased in accordance with the number of molds in the apparatus for producing hollow bodies from the preforms.

Further objects, features and advantages of the invention will be apparent from the description hereinafter of preferred embodiments.

BRIEF DESCRIPTION OF THE DRAWING

FIGS. 1A through 1D are diagrammatic views of a first embodiment of an apparatus in a blow molding machine in four successive operating conditions, FIGS. 2A through 2F are diagrammatic views of a second embodiment of an apparatus in a blow molding machine in six successive operating conditions, and FIGS. 3A through 3D are diagrammatic views of a third embodiment of an apparatus in a blow molding machine in four successive operating conditions.

DESCRIPTION OF PREFERRED EMBODIMENTS

Figure 1C:
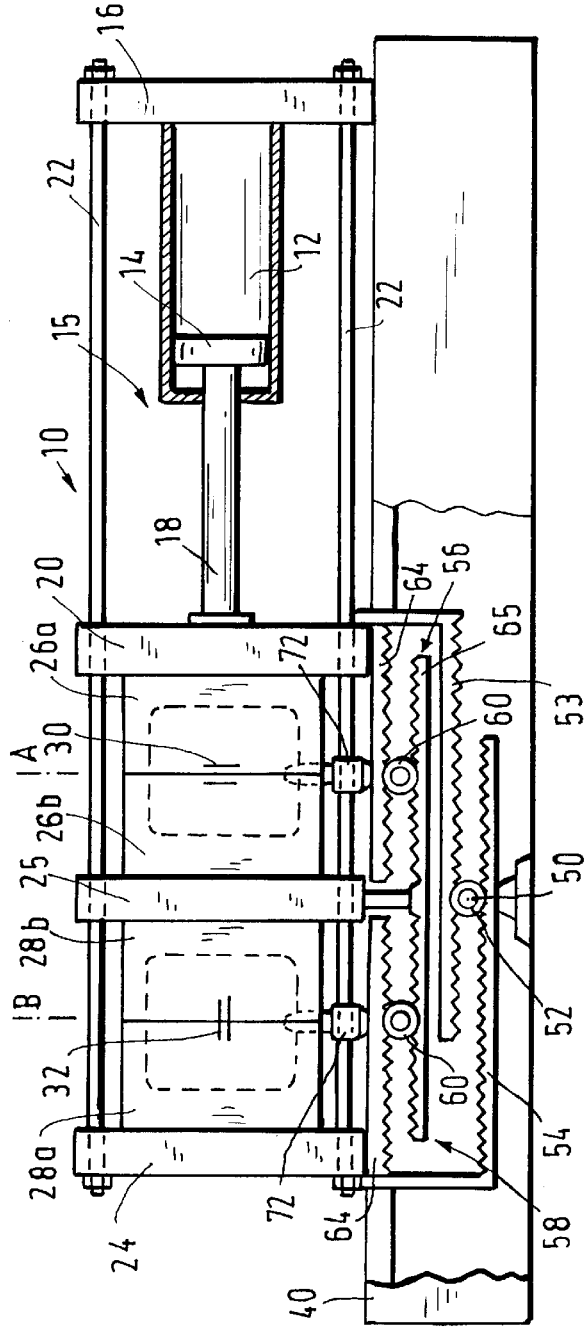

Referring firstly to FIGS. 1A through 1D, illustrated diagrammatically therein is part of an apparatus for the production of hollow bodies from thermoplastic material by means of blow molding of preforms, wherein reference numeral 10 denotes a closing support structure comprising a drive unit generally indicated at 15 comprising a cylinder 12 and a piston 14 movable therein. The cylinder 12 of the drive unit 15 is carried by a drive member illustrated in the form of a drive plate 16 while the piston rod 18 of the piston 14 is connected to a first carrier member indicated in the form of a carrier plate 20 arranged at a spacing from the drive plate 16. The drive plate 16 is connected by way of beams 22 to a second carrier member illustrated in the form of a carrier plate 24 disposed at the side of the first carrier plate 20, which is remote from the drive plate 16. Arranged between the first carrier plate 20 and the second carrier plate 24 is a third carrier member illustrated in the form of a carrier plate 25 which, like the first carrier plate 20, is guided on the beams 22 and is freely displaceable relative thereto.

The first carrier plate 20 and the second carrier plate 24 each carry at their side towards the third carrier plate 25 a respective mold portion 26a and 28a respectively, co-operating with a respective mold portion 26b and 28b carried by the third carrier plate 25, and forming therewith a first blow molding mold 26a, 26b and a second blow molding mold 28a, 28b. The two molds 26a, 26b; 28a, 28b are each provided with a respective locking device indicated at 30 and 32 respectively in highly diagrammatic form in for example FIG. 1A. The function of the locking devices 30, 32 is to ensure that the two mold portions 26a, 26b and 28a, 28b of each mold are locked together in the mold-closed condition in such a way that the forces resulting from the blow molding pressure applied in the interior of the preform disposed in the respective mold cannot move the two mold portions thereof away from each other.

The locking devices may be of different design configurations. On the one hand, there is the possible option of the components forming the locking device being mounted on the mold portions 26a, 26b; 28a, 28b. Another possible option is for the components of the locking device to be carried on the carrier plates 20/25 and 25/24 respectively.

The first-mentioned option has the advantage that the locking device can be installed and set up outside the blow molding machine so that, after the mold portions have been mounted to the carrier plates, the locking device can always be accurately set and thus, after a change in blow molding mold, there is no need for significant working operations to be implemented in order to adapt the locking device to the respective operating circumstances involved.

The advantage when mounting the locking device to the carrier plates is that, upon a change in blow molding mold, the components can remain on the carrier plates as the locking device is a component part of the blow molding machine. In the normal situation on the other hand there is however the need after a change in blow molding mold for the locking device to be accurately adjusted in order to adapt it appropriately to the respective tooling concerned. That often requires qualified operators who work scrupulously carefully.

The state of the art already includes numerous precursor designs in respect of these two versions of a locking device so that there is no need at this juncture to set forth further details relating thereto, especially as it is thought to be self-evident that a locking device will normally comprise at least two locking components which as far as possible should be arranged symmetrically relative to the associated mold.

Starting from the position of the structure shown in FIG. 1A, in which the two molds 26a, 26b and 28a, 28b are closed and the piston 14 and the cylinder 12 of the drive unit 15 are in the extended condition, it will be assumed that the internal pressure required for preform expansion and during the subsequent cooling phase is still present in the first mold 26a, 26b so that the locking device 30 adopts its operative position and locks the two mold portions together. In contrast the locking device 32 of the second mold 28a, 28b is in the inoperative position so that, upon subsequent actuation of the drive unit 15, when the surface of the piston 14 that is remote from the drive plate 16 and the oppositely disposed surface of the cylinder are subjected to the action of actuating fluid, the carrier plate 20 with the closed mold 26, the intermediate carrier plate 25 and the mold portion 28b, by virtue of the corresponding movement of the piston 14 in the cylinder 12, are displaced towards the right, in the direction indicated by the arrow 36 in FIG. 1B.

It will be noted in this respect that reference 48 denotes a synchronisation arrangement for synchronising the movements of the various components of the assembly, as will be apparent hereinafter.

In the movement of the above-indicated parts of the apparatus in the direction of the arrow 36, the action of the synchronisation arrangement 48 at the same time causes symmetrically with respect to the movement of the carrier plate 20 an oppositely directed movement of the carrier plate 24 towards the left, and that movement, by virtue of the rigid connection afforded by the beams 22, also causes a movement of the drive plate 16 towards the left in the direction of the arrow indicated at 34 in FIG. 1A, so that the mold 28a, 28b opens.

In the opened position of the mold 28a, 28b as shown in FIG. 1B, after the hollow body produced in the preceding operating cycle had been removed from the mold, the preform for the next operating cycle for the production of a hollow body is introduced into the mold afforded by the two mold portions 28a, 28b in the opened condition thereof. In that respect, the mold 28a, 28b is disposed in a receiving position as indicated by B, in which for example an extrusion head of an extrusion device for extruding the preform is disposed above the mold 28a, 28b, if the preform is introduced into the opened mold 28a, 28b directly by the extrusion device.

When the preform assumes its correct position and/or is of its required length, the second mold is closed by bringing the two mold portions 28a, 28b together. That is effected by suitable actuation of the hydraulic drive unit 15 in such a way that the piston 14, at its side towards the drive plate 16, and the end of the cylinder 12, in opposite relationship to that side, are acted upon by pressure fluid, with the consequence that the parts of the support structure perform movements in opposite relationship to those by which the parts of the support structure were moved from the position shown in FIG. 1A into that shown in FIG. 1B. This means that the drive plate 16 is displaced towards the right into the position shown in FIG. 1A or 1C, with the second carrier plate 24 performing a corresponding movement with the mold portion 28a. At the same time the third carrier plate 25 with the mold portion 28b carried thereon is displaced by way of the first carrier plate 20 and the mold portions 26a, 26b towards the left, in the direction indicated by the arrow 34, so that at the end of those two movements the second mold 28a, 28b is closed, and the support structure assumes the position which is illustrated in FIG. 1C and which corresponds to the position shown in FIG. 1A. After the conclusion of that closing movement or possibly also briefly before that, the locking device 32 can then be rendered operative again, so that the increased internal pressure which now takes effect for expanding the preform in the blow molding mold does not urge the mold portions 28a, 28b away from each other.

It will be noted at this point that, as a departure from the embodiment illustrated in FIGS. 1A through 1D, it is possible to provide an additional device which comes into operation shortly before the mold is completely closed in order to apply the forces, or at least a part thereof, required for squeezing off excess material from the preform. In that respect it is appropriate to provide only one such device for all the molds, as there is only ever one mold closed at any time.

Figure 1D:
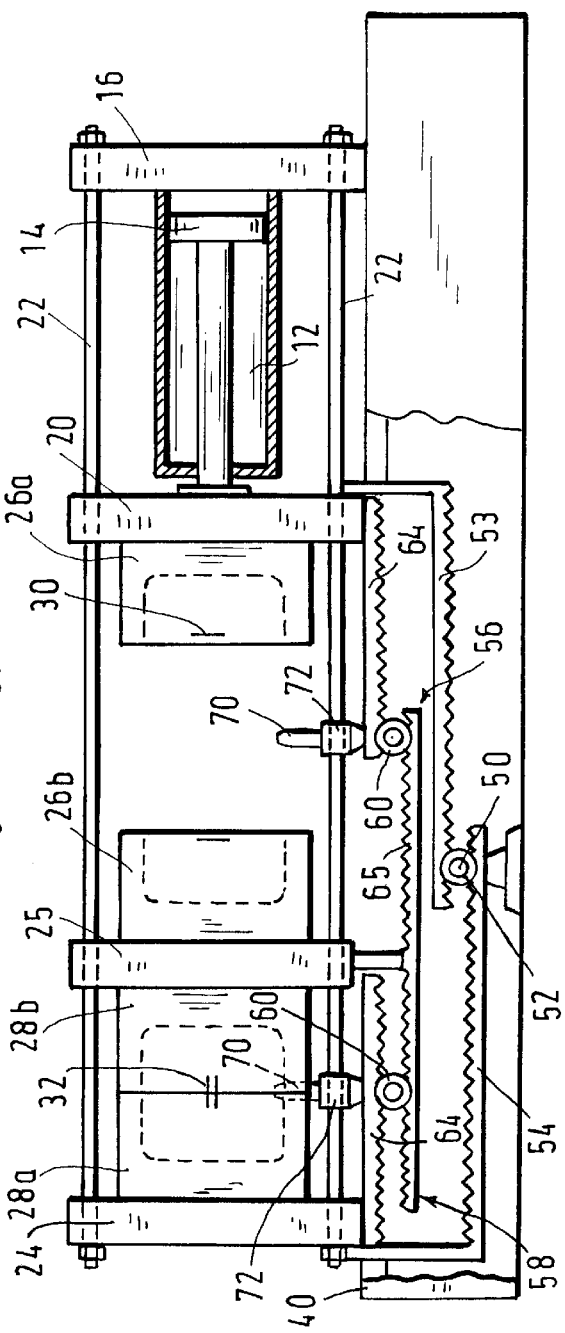

Depending on the time required for the preform which has been expanded in the mold to be cooled down to such a degree that it is self-supporting, the first mold 26a, 26b can then be opened either immediately after locking of the second mold 28a, 28b or also at a given interval therefrom. For that purpose the locking device 30 of the first mold 26a, 26b is initially rendered inoperative, as indicated in FIG. 1C. Then, by suitable actuation of the drive unit 15, the two mold portions 26a, 26b can be moved away from each other so that the mold 26a, 26b assumes its open position as shown in FIG. 1D. Now the expanded and sufficiently cooled hollow body can be removed from the mold 26a, 26b and then a preform for the next operating cycle can be introduced into the first mold which is in the open position. Thereafter the mold 26a, 26b can be closed again around the preform by suitable actuation of the drive unit 15 so that at the end of the closing operation, the parts are again in the position shown in FIG. 1A. The next step that then occurs is opening of the mold 28a, 28b, which has already been described with reference to FIGS. 1A and 1B.

In regard to the closing and opening movements of the mold portions, in particular when using a hydraulic drive system, it is generally necessary for those movements to take place in a defined relationship with respect to a reference plane of the main frame assembly of the blow molding machine, and reproducibly at any time, for example in such a way that the mold portions move symmetrically towards the central plane of a preform disposed centrally therebetween and away from the hollow body which has been produced from the preform by expansion thereof. In general terms the arrangement is such that the synchronisation means 48 has at least one mechanical connecting element which is mounted to the main frame structure of the blow molding machine and by which the mold portions are kinematically coupled together. In that respect, the mechanical connecting element will normally be arranged to be stationary. There is however also the possibility of arranging for it to be displaceable, for the purposes of additionally influencing the opening and/or closing movements.

Looking still at FIGS. 1A through 1D, the embodiment illustrated therein is provided with the above-mentioned synchronisation arrangement 48 comprising a gear 52 mounted rotatably on a shaft 50 and in engagement with racks 53, 54. The rack 53 is connected to the first carrier plate 20 and the rack 54 is connected to the second carrier plate 24. The synchronisation arrangement 48 can also be designed and arranged in such a way that the rack 53 is connected to the drive plate 16 and the rack 54 is connected to the first carrier plate 20. The only important consideration is that those two components on which the drive unit acts directly or indirectly are kinematically connected together by way of the synchronisation arrangement 48.

The gear 50 of the synchronisation arrangement 48 is fixed to the main frame structure 40 of the machine, on which the carrier plates 20, 24, 25 of the support structure 10 are also displaceably guided. For reasons of greater clarity of the drawing, the actual guides for the carrier plates and possibly also the beams 22 are not shown in the drawing.

The synchronisation arrangement 48 is thus alternately operative for the two molds 26a, 26b and 28a, 28b respectively, as the above-indicated condition is fulfilled in each closing and opening movement of the two molds. When the mold 26a, 26b opens or closes, the mold portion 26a is connected directly to the first carrier plate 20 on which the piston rod 18 of the piston 14 acts directly, whereas the second mold portion 26b is fixedly mounted to the third carrier plate 25 which in turn is fixedly connected by way of the mold portion 28b of the second mold, the locking device 32 and the mold portion 28a to the second carrier plate 24 which in turn is connected by way of the beams 22 to the drive plate 16 on which the cylinder 12 of the drive unit 15 acts.

A corresponding consideration also applies in regard to the second mold 28a, 28b, whose mold portion 28a is carried by the second carrier plate 24 and is thus connected to the drive plate 16 whereas the other mold portion 28b, upon opening and closing, is connected by way of the third carrier plate 25 and the mold portions 26a, 26b fixedly to the first carrier plate 20 which is engaged by the piston rod 18.

Normally, associated with each mold there are also additional functional elements which also take action in terms of molding the hollow body to be produced within the blow molding mold, and which possibly also perform additional functions, for example that of feeding the pressure agent into the preform for producing the increased internal pressure for expansion thereof. The means for feeding the pressure agent into the preform may involve for example a blowing mandrel or nozzle 70 which is carried by a holder 72 and which for example projects into the lower end of the generally tubular preform. In many cases, the blowing nozzle 70 is used to shape a small portion of the preform by means of press-shaping, for example to constitute a connecting portion or the like. Functional parts of that kind generally have to be oriented in a properly defined manner relative to the mold portions and possibly also have to remain in their aligned relationship during the closing and/or opening procedures, in order thereby to ensure for example that the tubular preform introduced into the mold in the open condition is guided in the appropriately specific and controlled manner over the at least one nozzle 70. For that purpose, it may be necessary for those functional parts of each mold to have, in operative association therewith, a specific synchronisation device as indicated at 56 and 58 for example in FIG. 1A, which also comprises a gear 60 and two racks 64, 65. Each of the two racks 64, 65 is connected to a respective one of the two carrier plates 20, 25 and 24, 25 of the respective mold. Secured to each of the two upper racks indicated at 64 is the holder 72 for the respective blowing nozzle 70 so that the two synchronisation devices 56 and 58 guarantee correct positioning of the blowing nozzle 70 in relation to the respectively associated mold 26a, 26b; 28a, 28b. A stationary arrangement of the holders 72, carrying the gears 60, of the two synchronisation devices 56, 58 is not required as the synchronisation arrangement 48 which is common to the two molds 26a, 26b; 28a, 28b guarantees correct positioning of the respective gear 60 and the synchronisation devices 56, 58 are not intended to ensure synchronous relationship of the respectively associated mold portions, but correct positioning of the respective blowing nozzle 70.

A comparison between FIGS. 1A and 1B on the one hand and FIGS. 1C and 1D on the other hand shows that the gears 60 of each mold are displaced in the opening or closing direction, when the opening and closing movements of the respective other mold are implemented. As the gears 60 are not fixed, there is no need for special measures to permit such movements of the gears 60.

In the embodiment described hereinbefore with reference to FIGS. 1A through 1D, each mold has its own receiving position as indicated at A and B respectively, in which a preform is introduced into the respective mold for expansion therein. Closing and opening movements of the mold portions take place symmetrically, unless particular precautionary measures are taken in that respect. Displacement of the mold with respect to the respectively associated receiving station takes place only when that mold is in the closed condition, more specifically, while the respective other mold is in the course of performing its opening and closing movements.

The presence of the first and second receiving stations A and B therefore presupposes that feed devices for supplying the preforms are also present in both stations. If the assembly has only one common extrusion system for production of the preforms, for both of the molds, then the arrangement can be such that the extrusion head of the extrusion system is reciprocatable between the two receiving stations A and B. Another possible option in that respect involves arranging the extrusion head of the common extrusion system stationarily and moving the preform from the extrusion head into the respective receiving station A and B by means of at least one transport device. Those two options involve structures which are generally known and familiar so that it is thought that there is no need for a specific description herein, in relation thereto.

Reference will now be made to FIGS. 2A through 2F showing an embodiment of a blow molding machine which is identical in terms of its basic structure to that shown in FIGS. 1A through 1D so that the same components are also denoted by the same references which however in the embodiment of FIGS. 2A through 2F are each increased by 100.

The essential difference between the two embodiments is that the support structure 110 of the embodiment shown in FIGS. 2A through 2F is displaceable in its entirety in a horizontal plane in the direction indicated by the arrows 134 and 136, relative to the main frame 140 which carries the closing support structure 110. The extent of such displacement corresponds to the spacing between the two separating surfaces indicated at 142 and 144 of the two molds 126a, 126b and 128a, 128b. The spacing between the two separating surfaces 142 and 144 corresponds to the thickness of the mold portions 126a, 126b, that is to say the extent thereof in the direction of the closing and opening movements 134 and 136, in conjunction with the thickness of the third carrier member illustrated in the form of a plate 125. Such displaceability of the support structure 110 in its entirety makes it possible to provide a common receiving station indicated at X for both of the blow molding molds, so that there is then no necessity for the preforms to be transported alternately to first and second receiving stations, or for the extrusion head to be reciprocated between the two receiving stations A and B of the embodiment as shown in FIGS. 1A through 1D. In the embodiment of FIGS. 2A through 2F, the displaceability of the support structure 110 provides that the main frame 140 is longer than in the first embodiment of FIGS. 1A through 1D.

The operating procedure as illustrated in FIGS. 2A through 2C corresponds in substance to that of FIGS. 1A through 1C: the mold 128a, 128b which is in the receiving station is unlocked, as indicated in FIG. 2A, and opened by suitable actuation of the drive unit 115. After removal of the molded product or hollow body produced in the preceding operating cycle and the subsequent introduction of a preform for the next operating cycle, the mold 128a, 128b is closed again and locked, as shown in FIG. 2C. During those steps in the procedure, the support structure 110 in its entirety has not changed in position with respect to the main frame 140.

After the operating condition shown in FIG. 2C is reached, that is to say after closure of the mold 128a, 128b, the support structure 110 in its entirety is displaced in the direction of the arrow 134 illustrated in FIG. 2A by a distance which corresponds to the spacing between the two separating surfaces 142 and 144 of the two molds, with the result that, at the end of that movement in the direction of the arrow 134, the mold 126a, 126b is in the receiving station X, as shown in FIG. 2D. To implement that movement of the support structure 110, it is immaterial whether the two molds 126a, 126b and 128a, 128b are locked, as a second drive 146 is provided to produce that movement. In the embodiment shown in FIGS. 2A through 2F, the second drive 146 is also in the form of a piston-cylinder unit comprising a cylinder 147 and a piston 145, engaging the drive member illustrated in the form of the drive plate 116. The drive however may also be of another design configuration and connected to another part of the support structure 110, for example to the holder 176 for the shaft 150 which in turn carries the gear 152 of the synchronisation arrangement 148. In this case, the displacement travel of the second drive 146 or the piston 145 displaceable in the cylinder 147 thereof is smaller than when acting on the drive plate 116 as there is no need to take account of the movements of the latter in connection with the opening and closing movements of the mold portions in regard to the stroke movement of the piston 145.

After implementation of the displacement in the direction of the arrow 134, the mold 126a, 126b which is now in the receiving station X can be unlocked and opened in order to remove the hollow body produced in the preceding operating cycle from the mold and to introduce a preform for the next operating cycle into the mold. Thereafter, by suitable actuation of the first drive unit 115, the mold is closed again and locked so that the components of the assembly then assume the position shown in FIG. 2F. The support structure 110 in its entirety is then moved by suitable actuation of the second drive 146 in the direction of the arrow 136 back into the position shown in FIG. 2A in which once again the mold 128a, 128b is in the receiving station X. Further procedure is then implemented in the manner already described hereinbefore with reference to FIG. 2A.

It will be noted that the embodiment of FIGS. 2A through 2F also has a synchronisation arrangement 148 which is operative for the two molds of the support structure 110 and in regard to which the foregoing description relating to the synchronisation arrangement 48 of the embodiment shown in FIGS. 1A through 1D also applies. It will be appreciated however that there is a difference here insofar as it is necessary for the kinematic connecting member in the form of the gear 152 of the synchronisation arrangement 148 to be releasably connected to the main frame 140, in order thereby to take account of the fact that the support structure 110 is displaceable in its entirety in order to move the two molds selectively into the receiving station X. The embodiment of FIGS. 2A through 2F has two adjustable abutments indicated at 174 and 175 which are co-operable with the holder 176 carrying the gear 152 and which define the travel movement which the holders 176 and therewith the gear 152 cover in moving from the one position in which the mold 128a, 128b is in the receiving position X as shown in FIGS. 2A through 2C, into the second position in which the mold 126a, 126b is in the receiving station X as shown in FIGS. 2D through 2F.

The holder 176 for the gear 152 is to be releasably secured to the machine frame 140 in the respective operational position by suitable means (not shown). The abutments 174 and 175 can also be mounted releasably to the machine frame 140 so that they can be moved in the direction of the arrows 134, 136 into the respective position which corresponds to the spacing between the two separating surfaces 142 and 144 of the two molds. In that way, by suitable adjustment of the abutments 174 and 175, it is possible to provide for adaptation to different distances between the separating surfaces 142, 144, which arise out of different molds being of varying dimensions. Without a great deal of work, it is thus possible to adapt the spacing between the two abutments 174, 175 to the spacing of the separating surfaces 142, 144 of the mold portions which are respectively mounted to the carrier plates 120, 124, 125.

The mode of operation of the synchronisation devices 156 and 158 is the same as the mode of operation of the corresponding synchronisation devices 56 and 58 of the embodiment of FIGS. 1A through 1D, and reference will accordingly be directed to the description relating thereto.

Referring now to FIGS. 3A through 3D, the embodiment shown therein, apart from the design configuration of the synchronisation arrangement, is substantially the same as the embodiment of FIGS. 1A through 1D so that the same components will also be denoted by the same references but increased in each case by 200 in FIGS. 3A through 3D.

The only difference of substance between the first embodiment and the embodiment now being described is that the present embodiment of FIGS. 3A through 3D does not have the synchronisation arrangement 48 (FIGS. 1A through 1D) or 148 (FIGS. 2A through 2F) common to the two molds, and thus synchronisation of the two molds formed by the mold portions 226a, 226b and 228a, 228b is implemented by the respective synchronisation devices 256 and 258. Accordingly, in a departure from the above-described embodiments shown in FIGS. 1A through 1D and FIGS. 2A through 2F, there is a need for the holder 262 which carries the gear 260 to be arrested during the opening and closing movements of the respectively associated mold. For that purpose, each holder 262, at its end remote from the respective mold, is provided with a forked extension 278 with which there is associated an arresting device in the form of a bolt member 280 which can be moved up and down in the drawing. In its upper end position the bolt member 280 engages into the forked extension 278 and arrests the respective holder 262 so that the gear 260 carried thereby can admittedly rotate but cannot perform any linear movements in the direction of the opening and closing movements performed by the mold portions. In this embodiment also the holder 262 may carry a blowing mandrel or nozzle as indicated at 270.

FIG. 3A shows an operating condition in which the mold 226a and 226b is locked while the mold 228a, 228b is unlocked as that mold is to be opened. Consequently, the holder 262 for the gear 260 of the synchronisation device 258 is arrested so that the bolt member 280 of the arresting device associated with the second synchronisation device 258 is in its operative position in which therefore it engages into the forked extension 278 of the holder 262. Consequently the second synchronisation device 258 provides for synchronisation of the two mold portions 228a, 228b when they are moved from the position shown in FIG. 3A into that shown in FIG. 3B by suitable actuation of the hydraulic drive unit 215. As FIGS. 3A and 3B show, during the opening movement the holder 262 for the gear 260 of the first synchronisation device 256 is unlocked as the bolt member 280 of the arresting device 279 is out of engagement with the forked extension 278 of the holder 262 of the first synchronisation device 256 which is operatively associated with the mold 226a, 226b. Consequently, the first synchronisation device 256 can unimpededly follow the movement of the closed mold 226a, 226b, which is produced by opening of the mold 228a, 228b.

Figure 3C:
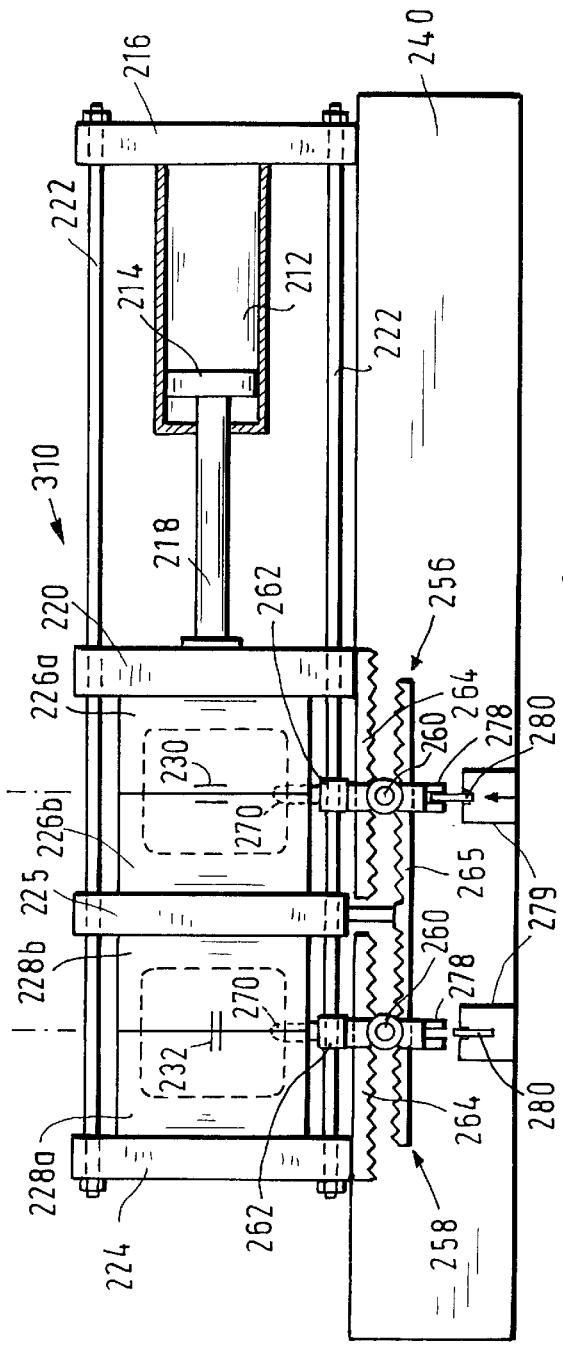

A corresponding consideration also applies in regard to the movement of the first mold 226a, 226b back into the starting position as shown in FIG. 3C, which is produced by virtue of closure of the mold 228a, 228b. In this case now the holder 262 for the gear 260 of the first synchronisation device 256 is arrested by virtue of the associated bolt member 280 being displaced upwardly into its operative position as shown in FIG. 3C. At the same time the arresting action in respect of the holder 262 of the second synchronisation device 258 can be removed by the associated bolt member 280 moving downwardly and being brought out of engagement with the associated forked extension 278, as is also shown in FIG. 3C. The actuating means for the two arresting devices 279 can be such that the holder of one synchronisation device is necessarily arrested while at the same time the arresting action in respect of the respective other synchronisation device is removed.

Figure 3D:
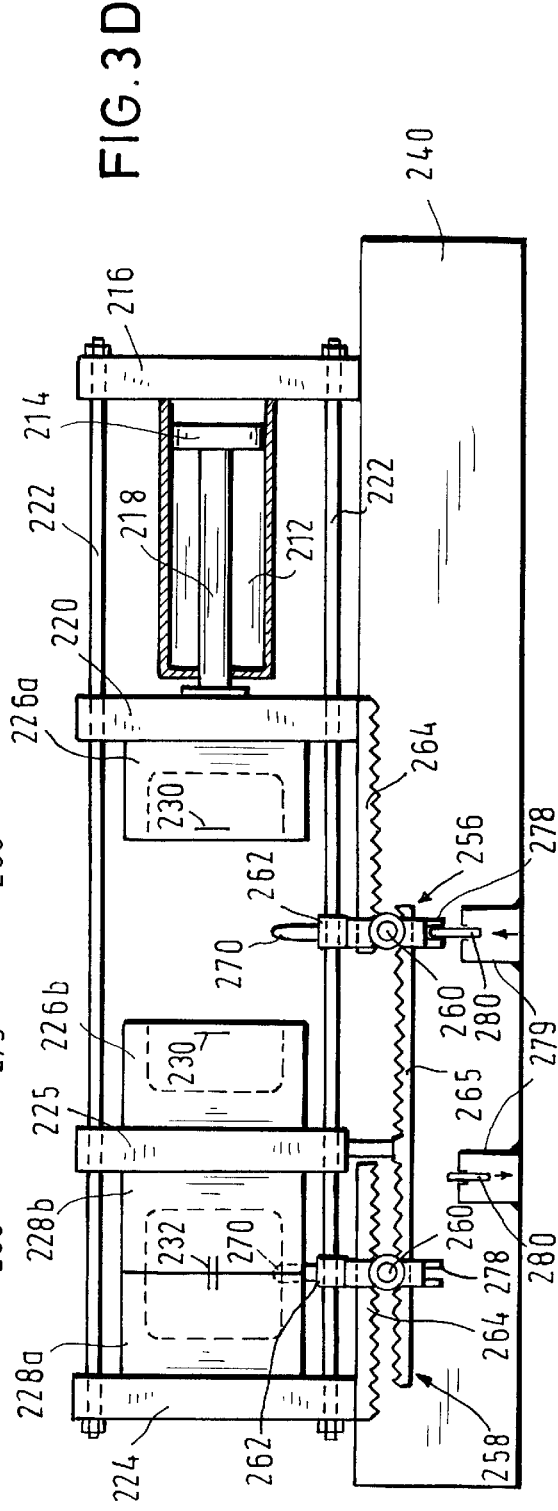

Upon subsequent opening of the mold 226a, 226b, as FIG. 3D shows, the second synchronisation device 258 is displaced with the associated mold 228a, 228b, with respect to the arresting device 279.

It will be appreciated that it is also possible for the embodiment shown in FIGS. 3A through 3D to have only one receiving station X which is common to both molds, as is the case in the configuration shown in FIGS. 2A through 2F. As then the two molds would only have to be respectively closed and opened in the one common receiving station, it is sufficient in that case to provide only one arresting device for both synchronisation devices 256 and 258, which would then be associated with the receiving station X. If in this embodiment displacement of the closing support structure 210 Is also to be effected in its entirety in a similar manner to the embodiment of FIGS. 2A through 2F, an additional drive would also have to be provided, similar to the drive 146 therein.

Although the above-described embodiments use exclusively hydraulic drive units, it will be appreciated that it is also possible to use other drive means, for example electric-motor drives. It is also possible to envisage combinations such that for example the drive unit for opening and closing the molds is by electric motor means while the drive unit for displacement of the closing support structure 110, 210 in its entirety is actuated hydraulically.

It will be further noted that when reference is made hereinbefore to the drive plate and the carrier plate, such reference is not intended to constitute a limitation in this respect. It is therefore also possible to use members which are not of a plate configuration although in a practical context those members are primarily in the form of plates.

It will be appreciated that the above-described embodiments of the invention have been set forth solely by way of example and illustration thereof and that various other modifications may be made therein without thereby departing from the spirit and scope of the invention.

What is claimed is:

1. A process for the production of hollow bodies from thermoplastic material by means of blow molding of preforms using a closing support structure which has at least first and second blow molding molds each comprising at least first and second mold portions reciprocatable between an open condition in which they are at a spacing from each other and a closed condition in which they define a mold cavity, a common drive means for producing said reciprocating movement, a drive member engaged by the drive means, a first carrier member engaged by the drive means and carrying a mold portion, a second carrier member carrying another mold portion and connected to the drive member, at least one further carrier member arranged displaceably in the opening and closing direction between the first carrier member and the second carrier member, said at least one further carrier member having first and second sides and carrying at each of the sides thereof a respective mold portion and each of said mold portions being co-operable with a mold portion carried by a respective adjacent carrier member to form a blow molding mold, for each of the blow molding molds a means operable to lock the respective blow molding mold in the closed condition thereof, the closing support structure further including at least one synchronisation means by which the closing and opening movements of the portions of the respective mold are effected symmetrically.

2. A process as set forth in claim 1
   wherein the locking means for each blow molding mold are operative between the carrier members of the respective blow molding mold.

3. A process as set forth in claim 1
   wherein the locking means are components of the blow molding molds and are operatively directly between the mold portions.

4. A process as set forth in claim 1
   wherein the movement of the mold portions for closure of the preform is produced by the common drive means for the mold portions.

5. A process as set forth in claim 4
   wherein the movement of the mold portions is operable for squeezing off excess material on the preform.

6. A process as set forth in claim 1
   wherein the support structure is displaceable between at least first and second positions in such a way that one of the blow molding molds is disposed in a common receiving position in which the respective blow molding mold disposed there receives a preform.

7. Apparatus for producing hollow bodies from thermoplastic material by means of blow molding of preforms, including
   a closing support structure,
   at least one blow molding mold on the support structure and comprising at least first and second mold portions which are reciprocatable between an open condition in which they are at a spacing from each other and a closed condition in which they define a mold cavity,
   a common drive means for producing said reciprocating movement, a drive member engaged by said drive means, a first carrier member engaged by the drive means and carrying a mold portion, a second carrier member connected to the drive member and carrying another mold portion, at least one further carrier member arranged displaceably in the opening and closing direction between the first carrier member and the second carrier member, said at least one further carrier member having first and second sides and carrying at each of the sides thereof a respective mold portion and each of said mold portions being co-operable with a mold portion carried by a respective adjacent carrier member to form a blow molding mold, means for each of the blow molding molds operable to lock the respective blow molding mold in the closed condition thereof, and at least one synchronisation means by which the closing and opening movements of the portions of the respective mold are effected symmetrically.

8. Apparatus as set forth in claim 7 comprising first, second and third carrier members.

9. Apparatus as set forth in claim 7 wherein the components of the locking means for each blow molding mold comprise components secured to the associated carrier members at the respective blow molding mold.

10. Apparatus as set forth in claim 7 wherein the locking means are mounted to the mold portions of the respective blow molding mold.

11. Apparatus as set forth in claim 7 including means for displacing the support structure operable to move the blow molding molds alternately into a receiving position for receiving a respective preform.

12. Apparatus as set forth in claim 7 wherein associated with each of the blow molding molds is a respective receiving position for receiving a preform.

13. Apparatus as set forth in claim 7 wherein the synchronisation means is operative between first and second carrier members carrying mold portions of different blow molding molds.

14. Apparatus as set forth in claim 7 wherein each blow molding mold is provided with a synchronisation device for positioning functional members whose connecting element is displaceable in the direction of the opening and closing movements.

15. Apparatus as set forth in claim 7 wherein the drive member and each said carrier member is in the form of a plate.

* * * * *

UNITED STATES PATENT AND TRADEMARK OFFICE
CERTIFICATE OF CORRECTION

PATENT NO. : 6,488,884 B1
DATED : December 3, 2002
INVENTOR(S) : Daubenbüchel et al.

It is certified that error appears in the above-identified patent and that said Letters Patent is hereby corrected as shown below:

<u>Title page,</u>
Item [73], should read:
-- [73] Assignee: SIG Kautex GmbH & Co. KG, Bonn (DE) --

Signed and Sealed this

Thirteenth Day of May, 2003

JAMES E. ROGAN
*Director of the United States Patent and Trademark Office*